United States Patent
Heo et al.

(10) Patent No.: US 11,881,586 B2
(45) Date of Patent: Jan. 23, 2024

(54) PROTECTED ANODE, ELECTROCHEMICAL DEVICE INCLUDING THE SAME, AND METHOD OF PREPARING THE ELECTROCHEMICAL DEVICE

(71) Applicant: SAMSUNG ELECTRONICS CO., LTD., Suwon-si (KR)

(72) Inventors: Sung Heo, Suwon-si (KR); Kihong Kim, Asan-si (KR); Jusik Kim, Hwaseong-si (KR); Ryounghee Kim, Uiwang-si (KR); Wooyoung Yang, Hwaseong-si (KR); Myungjin Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 17 days.

(21) Appl. No.: 17/537,839

(22) Filed: Nov. 30, 2021

(65) Prior Publication Data
US 2023/0011360 A1    Jan. 12, 2023

(30) Foreign Application Priority Data

Jul. 7, 2021 (KR) .................. 10-2021-0089158

(51) Int. Cl.
*H01M 4/62* (2006.01)
*H01M 10/0525* (2010.01)
*H01M 4/04* (2006.01)
H01M 4/02 (2006.01)
H01M 10/0562 (2010.01)

(52) U.S. Cl.
CPC ......... *H01M 4/628* (2013.01); *H01M 4/0426* (2013.01); *H01M 10/0525* (2013.01); *H01M 10/0562* (2013.01); *H01M 2004/027* (2013.01); *H01M 2300/008* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 10,424,775 B2 | 9/2019 | Kim et al. | |
| 10,978,699 B2 | 4/2021 | Herle et al. | |
| 2017/0373304 A1* | 12/2017 | Kim | H01M 4/0471 |
| 2020/0343533 A1 | 10/2020 | Herle | |
| 2020/0343577 A1 | 10/2020 | Park et al. | |
| 2021/0359297 A1 | 11/2021 | Kim et al. | |

FOREIGN PATENT DOCUMENTS

| | | |
|---|---|---|
| KR | 1020170120981 A | 11/2017 |
| KR | 1020180001973 A | 1/2018 |
| KR | 1020190079321 A | 7/2019 |
| KR | 1020190122590 A | 10/2019 |
| KR | 1020210022030 A | 3/2021 |

* cited by examiner

*Primary Examiner* — Christopher P Domone
(74) *Attorney, Agent, or Firm* — CANTOR COLBURN LLP

(57) ABSTRACT

A protected anode, an electrochemical device including the same, and a method of preparing the electrochemical device. The protected anode may include: an anode layer; and a protective layer including an oxide represented by Formula 1, on the anode layer:

$$A_xM_yO_{1-x-y} \quad \text{Formula 1}$$

In Formula 1, A is at least one of Ge, Sb, Bi, Se, Sn, or Pb; M is at least one of In, Tl, Sb, Bi, S, Se, Te, or Po; A and M are different from each other; and 0<x<100 and 0<y<100.

24 Claims, 10 Drawing Sheets

PROTECTED ANODE, ELECTROCHEMICAL DEVICE INCLUDING THE SAME, AND METHOD OF PREPARING THE ELECTROCHEMICAL DEVICE

CROSS-REFERENCE TO RELATED APPLICATION

This application claims priority to and the benefit of Korean Patent Application No. 10-2021-0089158, filed on Jul. 7, 2021, in the Korean Intellectual Property Office, and all the benefits accruing therefrom under 35 U.S.C. § 119, the content of which in its entirety is herein incorporated by reference.

BACKGROUND

1. Field

The present disclosure relates to a protected anode, an electrochemical device including the same, and a method of preparing the electrochemical device.

2. Description of the Related Art

An electrochemical device, for example, an all-solid secondary battery, uses lithium metal having high energy density as an anode for high-energy density; and a solid electrolyte as an electrolyte.

When a solid electrolyte is used, dendrites may form on a surface of lithium metal during charge and discharge of the all-solid secondary battery. The dendrites may be caused by uneven contact between the solid electrolyte and the lithium metal, for example, due to degraded adhesive properties at the interface between the solid electrolyte and the lithium metal. As a result, a capacity of the all-solid secondary battery may decrease, and a short circuit may occur.

Therefore, there is need for a protected anode including a novel material as an anode protective layer, an electrochemical device including the protected anode, and a method of preparing the electrochemical device. The anode protective layer reduces interfacial resistance between a solid electrolyte and a lithium metal and improves electrochemical properties such as an increase in electrochemical stability and an increase in discharge capacity.

SUMMARY

Provided are protected anodes that reduce interfacial resistance between an anode layer and an electrolyte layer and have improved electrochemical characteristics such as an increase in electrochemical stability and an increase in discharge capacity.

Provided are electrochemical devices including the protected anodes.

Provided are methods of preparing the electrochemical devices.

Additional aspects will be set forth in part in the description which follows and, in part, will be apparent from the description, or may be learned by practice of the presented embodiments of the disclosure.

According to an aspect of an embodiment, a protected anode includes an anode layer; and a protective layer including an oxide represented by Formula 1, on the anode layer:

Formula 1

In Formula 1,
A is at least one of Ge, Sb, Bi, Se, Sn, or Pb,
M is at least one of In, Tl, Sb, Bi, S, Se, Te, or Po,
A and M are different from each other, and
$0<x<100$ and $0<y<100$.

According to an aspect of an embodiment, an electrochemical device includes a cathode layer; a solid electrolyte layer; and a protected anode layer, in the stated order, wherein the protected anode layer includes: an anode layer; and a protective layer including an oxide represented by Formula 1, on the anode layer:

$$A_xM_yO_{100-x-y}$$ Formula 1

In Formula 1,
A is at least one of Ge, Sb, Bi, Se, Sn, or Pb,
M is at least one of In, Tl, Sb, Bi, S, Se, Te, or Po,
A and M are different from each other, and
$0<x<100$ and $0<y<100$.

According to an aspect of an embodiment, a method of preparing the electrochemical device includes forming an anode active material layer on an anode current collector; and depositing an oxide represented by Formula 1 on the anode active material layer to prepare a protected anode:

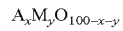

Formula 1

In Formula 1,
A is at least one of Ge, Sb, Bi, Se, Sn, or Pb,
M is at least one of In, Tl, Sb, Bi, S, Se, Te, or Po,
A and M are different from each other, and
$0<x<100$ and $0<y<100$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
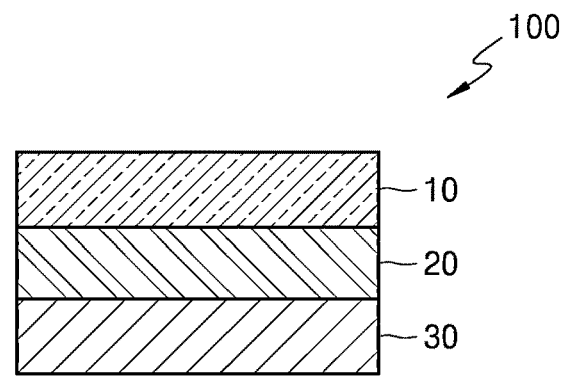
FIG. 1 is a schematic cross-sectional view of an embodiment of a protected anode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise stated herein, the term "combinations" is inclusive of mixtures, alloys, reaction products, and the like. It will be understood that unless otherwise stated herein, the terms "comprises" and/or "comprising," or "includes" and/or "including" do not preclude other elements, but further include other elements. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments. It will be understood that when an element is referred to as being "on" another element, it may be directly on the other element or intervening elements may be present therebetween. In addition, it is to be understood that the described elements may be combined in any suitable manner in the various embodiments. Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a C-rate means a current which will discharge a battery in one hour, e.g., a C-rate for a battery having a discharge capacity of 1.6 ampere-hours would be 1.6 amperes.

Hereinafter, a protected anode according to an embodiment, an electrochemical device including the protected anode, and a method of preparing the electrochemical device, will be described in further detail with reference to the accompanying drawings. These embodiments are provided for illustrative purposes only and are not intended to limit the scope of the present disclosure, and the present disclosure should be defined by the spirit and scope of the appended claims.

An electrochemical device, for example, an all-solid secondary battery may use lithium metal as an anode for improvement of energy density. The lithium metal anode may have dendrites which are crystals with a leaf-like shape formed on a surface of the lithium metal during charge and discharge. Dendrites may interrupt migration of lithium ions which may lead to a short circuit of a lithium secondary battery. Therefore, a charging/discharging efficiency of the lithium secondary battery may be degraded, and a lifespan of the lithium secondary battery may be reduced. The formation of the dendrites may be caused by uneven contact between the lithium metal and the solid electrolyte layer, for example, due to deterioration of the interfacial adhesive characteristics and by growth of lithium metal around the grain boundary. In order to solve the problem, studies on preventing the formation of dendrites by preparing a nano-coating layer on the lithium metal surface or using a novel material are in progress. However, dendrite formation inhibitory effect of these studies is insignificant.

The present inventors have surprisingly discovered a protective layer including a novel material as an interfacial layer on an anode layer such as lithium metal. According to an embodiment, provided is a protected anode including the protective layer, an electrochemical device including the protected anode, and a method of preparing the electrochemical device.

Hereinafter, a protected anode, an electrochemical device including the same, and a method of preparing the electrochemical device will be described in detail.

Protected Anode

FIG. 1 is a cross-sectional view of a protected anode 100 according to an embodiment.

Referring to FIG. 1, the protected anode 100 includes an anode current collector and an anode active material layer 20 as an anode layer; and a protective layer 30 on the anode active material layer 20.

According to an embodiment, the protected anode 100 may include an anode layer; and a protective layer including an oxide represented by Formula 1 on the anode layer:

$$A_xM_yO_{100-x-y}$$ Formula 1

In Formula 1,

A is at least one of Ge, Sb, Bi, Se, Sn, or Pb,
M is at least one of In, Tl, Sb, Bi, S, Se, Te, or Po,
A and M are different from each other, and
$0<x<100$ and $0<y<100$.

The protected anode 100 includes an oxide of an oxygen-doped AB-based material as the protective layer 30. The protected anode 100 may have decreased interfacial resistance between an anode layer and an electrolyte layer during charge and discharge as compared to the interfacial resistance between an anode layer and an electrolyte layer during charge and discharge of an anode not including the protective layer 30, and thus inhibition of short circuit occurrence by the protected anode 100 may improve. Also, the protected anode 100 may have improved electrochemical characteristics such as an increase in electrochemical stability and an increase in discharge capacity.

For example, the protected layer 30 may include an oxide represented by Formula 2.

$$Ge_{x'}Te_{y'}O_{100-x'-y'}$$ Formula 2

In Formula 2, $0<x'<100$ and $0<y'<100$.

For example, the protective layer 30 may include at least one of $Ge_{46.65}Te_{46.27}O_{7.08}$, $Ge_{46.65}In_{46.27}O_{7.08}$, $Ge_{46.65}Sb_{46.27}O_{7.08}$, $Ge_{46.65}S_{46.27}O_{7.08}$, $Sb_{46.65}Te_{46.27}O_{7.08}$, $Se_{46.65}Te_{46.27}O_{7.08}$ or $Ge_{46.65}Se_{46.27}O_{7.08}$.

The protective layer 30 may include a crystalline oxide or an amorphous oxide. For example, the protective layer 30 may include an amorphous oxide.

Figure 2:
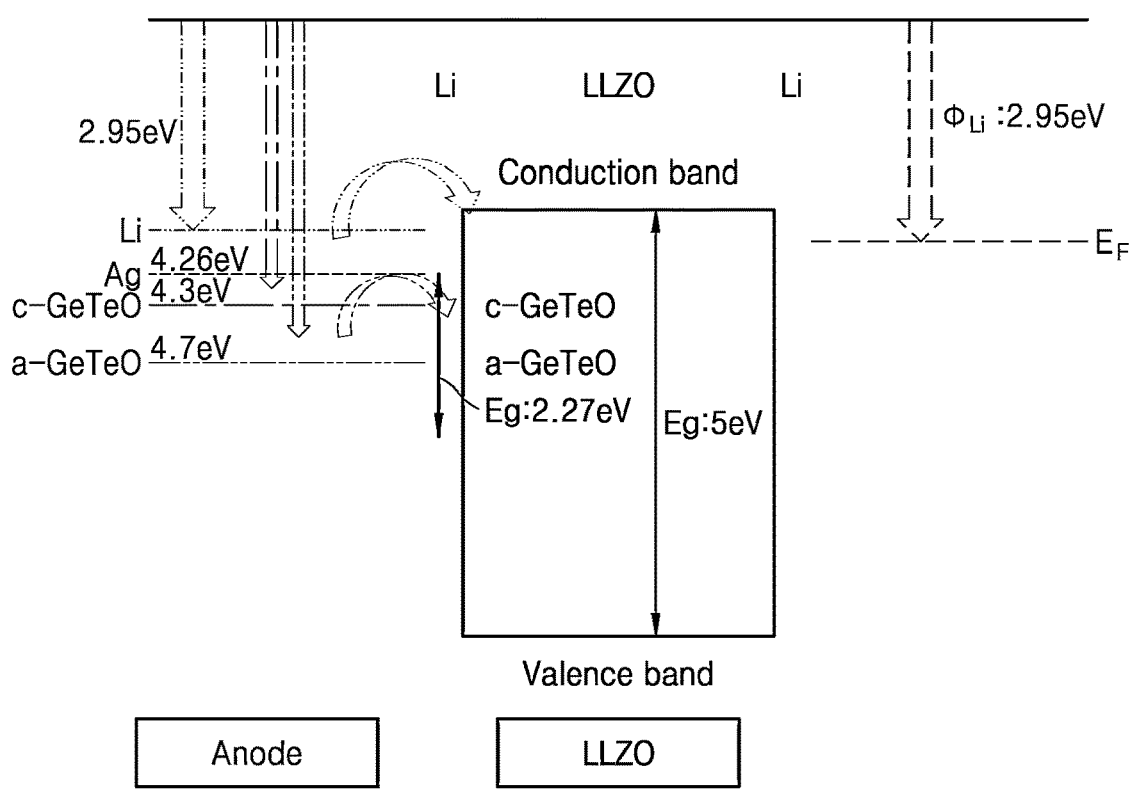
FIG. 2 is a schematic view that illustrates work functions and (energies of) band gaps of materials in a protective layer.

FIG. 2 is a schematic view that illustrates work functions and band gaps of materials in the protective layer 30. Here, the work function refers to the energy difference when one electron moves between the highest level (Fermi level), where the electrons of a certain substance are full, and the potential level outside the substance. An amount of 1 eV refers to the work or energy when one electron moves a potential difference of 1 V. The band gap refers to an energy region, in which there is no electron state, between energy bands representing the electron state of a substance to be obtained, and usually refers to the energy gap between the valence band occupied by electrons and the vacant conduction band.

If the energy (gap) of the band gap between the valence band fully occupied by electrons and the completely-empty conduction band is much greater than the energy at room temperature, electrons cannot move because the probability that the electrons rise to the excited state of the conduction band is close to zero. On the contrary, if the energy (gap) of the band gap is equal to or smaller than the energy corresponding to, e.g., at, room temperature, electrons in the valence band can easily be raised to the conduction band beyond the band gap, and the electrons in this excited state and the electron holes in the valence band can move relatively freely, so that they serve as charge carriers to make current flow.

FIG. 2 illustrates work functions and band gaps of crystalline $Ge_{x'}Te_{y'}O_{100-x'-y'}$ (where $0<x'<100$ and $0<y'<100$, also referred to as "c-GeTeO") and amorphous $Ge_{x'}Te_{y'}O_{100-x'-y'}$ (where $0<x'<100$ and $0<y'<100$, also referred to as "a-GeTeO") in the protective layer 30 as compared to the work functions and band gaps of the lithium metal anode layer. Referring to FIG. 2, work functions of crystalline $Ge_{x'}Te_{y'}O_{1-x'-y'}$ and amorphous $Ge_{x'}Te_{y'}O_{1-x'-y'}$ in the protective layer 30 are 4.3 eV and 4.7 eV, respectively, which are greater than a work function of a lithium metal anode layer, 2.95 eV. Band gaps of crystalline $Ge_{x'}Te_{y'}O_{1-x'-y'}$ and amorphous $Ge_{x'}Te_{y'}O_{1-x'-y'}$ in the protective layer 30 are 1.68 eV and 2.27 eV, respectively, which are greater than 1.5 eV. In an embodiment, a band gap of crystalline $Ge_{x'}Te_{y'}O_{1-x'-y'}$ and amorphous $Ge_{x'}Te_{y'}O_{1-x'-y'}$ in the protective layer may be about 1.5 to about 3 electronvolts. The work functions and band gaps may be obtained by electronic structure calculations based on the density function theory.

While not wanting to be bound by theory, it is understood that in the protective layer 30, materials having these work functions and band gaps may accumulate electrons on a surface of the lithium metal anode layer and an interface of the protective layer 30, which may decrease interfacial resistance between the lithium metal anode layer and the electrolyte layer. As a result, electrochemical characteristics of the protected anode 30 may improve.

Amorphous $Ge_{x'}Te_{y'}O_{1-x'-y'}$ has a greater work function and a greater band gap than the work function and band gap of crystalline $Ge_{x'}Te_{y'}O_{1-x'-y'}$. Therefore, the interfacial resistance between the lithium metal anode layer and the electrolyte layer may further decrease, and the electrochemical characteristics may further improve.

The protective layer 30 may include an amorphous oxide of which oxygen is uniformly distributed on a surface and inside of the protective layer 30, e.g., the oxide of the protective layer 30 may be an amorphous, and oxygen may be uniformly distributed on a surface of the protective layer and inside of the protective layer. When oxygen is uniformly distributed on a surface and inside of the protective layer 30, contact with a solid electrolyte layer, e.g., an oxide solid electrolyte layer may be more homogeneous than when oxygen is only distributed on the surface of the protective layer 30, and thus, not only interfacial resistance between the lithium metal anode layer and the electrolyte layer may further decrease, but also the electrochemical characteristics may further improve.

A thickness of the protective layer 30 may be in a range of about 1 nanometer (nm) to about 1 micrometer (μm). When the thickness of the protective layer 30 is less than this thickness range, the function as a protective layer may be deteriorated, and when the thickness of the protective layer 30 is greater than this thickness range, the thickness may act as a resistance.

The protective layer 30 may have an ion conductivity of about $1.5 \times 10^{-5}$ milliSiemens/centimeter ($mS \cdot cm^{-1}$) or greater at 25° C. For example, the protective layer 30 may have an ion conductivity of about $2.0 \times 10^{-5}$ $mS \cdot cm^{-1}$ or greater, about $2.5 \times 10^{-5}$ $mS \cdot cm^{-1}$ or greater, about $3.0 \times 10^{-5}$ $mS \cdot cm^{-1}$ or greater, about $3.5 \times 10^{-5}$ $mS \cdot cm^{-1}$ or greater, or about $3.8 \times 10^{-5}$ $mS \cdot cm^{-1}$ or greater. In an embodiment, the protective layer 30 may have ion conductivity of about $1.5 \times 10^{-5}$ to about $1 \times 10^{-3}$ $mS \cdot cm^{-1}$ at 25° C.

The anode layer may include the anode current collector 10 and the anode active material layer 20, and the anode active material layer 20 may be a lithium metal layer or a lithium alloy layer.

Materials that constitute the anode current collector 10 may include copper (Cu), stainless steel, titanium (Ti), iron (Fe), cobalt (Co), or nickel (Ni). The anode current collector 10 may be formed of one of these metals, an alloy of two or more of these metals, or a coating material. The anode current collector 10 may be, for example, formed in a plate shape or foil shape.

A thin film may be formed on a surface of the anode current collector 10. The thin film may include an element alloyable with lithium. Examples of an element alloyable with lithium may include gold (Au), silver (Ag), zinc (Zn), tin (Sn), indium (In), silicon (Si), aluminum (Al), and bismuth (Bi). The thin film may include a metal of these metals or an alloy of various combinations of these metals.

A thickness of the thin film may be in a range of about 1 nm to about 500 nm, but the thickness of the thin film is not limited thereto. When the thickness of the thin film is within this range, a precipitation amount of lithium in the anode layer may be appropriate while sufficiently exhibiting functions by the thin film, which results in excellent characteristics of an all-solid secondary battery. The thin film may be formed on the anode current collector 10 using a vacuum-deposition method, a sputtering method, or a coating method such as plating method.

As a material that forms a lithium alloy layer of the anode active material layer 20, an alloy including lithium and indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn) may be used. However, the material that forms a lithium alloy layer of the anode active material layer is not limited thereto, and any suitable metal or metalloid capable of forming an alloy with lithium may be used.

The anode active material layer 20 may include appropriately mixed additives such as at least one of a conducting agent (e.g., electron conducting agent), a binder, a filler, a dispersant, or an ion conducting agent.

Electrochemical Device

According to an embodiment, an electrochemical device includes a cathode layer; a solid electrolyte layer; and a protected anode layer in the stated order, wherein the protected anode layer may include an anode layer; and a protective layer including an oxide represented by Formula 1 on the anode layer:

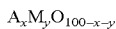            Formula 1

In Formula 1,
A is at least one of Ge, Sb, Bi, Se, Sn, or Pb,
M is at least one of In, Tl, Sb, Bi, S, Se, Te, or Po,
A and M are different from each other, and
$0 < x < 100$ and $0 < y < 100$.

An electrochemical device including a protected anode layer may have decreased interfacial resistance between an anode layer and an electrolyte layer during charge and discharge as compared to the interfacial resistance between an anode layer and an electrolyte layer during charge and discharge of an electrochemical device not including a protective layer, and thus inhibition of short circuit occurrence by the electrochemical device may improve. Also, the electrochemical device may have improved electrochemical characteristics such as an increase in electrochemical stability and an increase in discharge capacity.

For example, the protective layer may include an oxide represented by Formula 2:

            Formula 2

In Formula 2,
$0 < x' < 100$ and $0 < y' < 100$.

For example, the protective layer 30 may include at least one of $Ge_{46.65}Te_{46.27}O_{7.08}$, $Ge_{46.65}In_{46.27}O_{7.08}$, $Ge_{46.65}Sb_{46.27}O_{7.08}$, $Ge_{46.65}S_{46.27}O_{7.08}$, $Sb_{46.65}Te_{46.27}O_{7.08}$, $Se_{46.65}Te_{46.27}O_{7.08}$ or $Ge_{46.65}Se_{46.27}O_{7.08}$.

The protective layer may include a crystalline oxide or an amorphous oxide. For example, the protective layer may include an amorphous oxide.

The oxide in the protective layer may have a work function greater than the work function of the lithium metal anode layer and may have a band gap of about 1.5 eV or greater. In an embodiment, the oxide in the protective layer may have a band gap of about 1.5 to about 3 electronvolts.

When the protective layer is formed of an amorphous oxide, a work function of the protective layer is greater than the work function of a crystalline oxide, and a band gap of the protective layer is greater than the band gap of a crystalline oxide. Therefore, interfacial resistance between the lithium metal anode layer and the electrolyte layer may further decrease, and electrochemical characteristics of the protective layer may further improve.

The protective layer may include an amorphous oxide of which oxygen is uniformly distributed on a surface and inside of the protective layer. When oxygen is uniformly distributed on a surface and inside of the protective layer, contact with a solid electrolyte layer, e.g., an oxide solid electrolyte layer may be more homogeneous than when oxygen is only distributed on the surface of the protective layer, and thus, not only interfacial resistance between the anode layer and the electrolyte layer may further decrease, but also the electrochemical characteristics may further improve.

A thickness of the protective layer may be in a range of about 1 nm to about 1 μm. When the thickness of the protective layer 30 is less than this thickness range, the function as a protective layer may be deteriorated, and when the thickness of the protective layer 30 is greater than this thickness range, the thickness may act as a resistance.

The protective layer may have ion conductivity of about $1.5 \times 10^{-5}$ $mS \cdot cm^{-1}$ or greater at 25° C. For example, the protective layer may have ion conductivity of about $2.0 \times 10^{-5}$ $mS \cdot cm^{-1}$ or greater, about $2.5 \times 10^{-5}$ $mS \cdot cm^{-1}$ or greater, about $3.0 \times 10^{-5}$ $mS \cdot cm^{-1}$ or greater, about $3.5 \times 10^{-5}$ $mS \cdot cm^{-1}$ or greater, or about $3.8 \times 10^{-5}$ $mS \cdot cm^{-1}$ or greater. The protective layer may have an ion conductivity of about $1.5 \times 10^{-5}$ to about $1 \times 10^{-3}$ $mS \cdot cm^{-1}$ at about 25° C.

The solid electrolyte layer may include at least one of $Li_{3+x}La_3M_2O_{12}$, wherein $0 \leq x \leq 5$, and M=Te, Nb, or Zr, $Li_{1+x+y}Al_xTi_{2-x}Si_yP_{3-y}O_{12}$, (where $0 < x < 2$ and $0 \leq y < 3$, $BaTiO_3$, $Pb(Zr_zTi_{1-z})O_3$, (wherein $0 < z \leq 1$, "PZT")

$Pb_{1-x}La_xZr_{1-y}Ti_yO_3$, ("PLZT") (where $0 \leq x < 1$ and $0 \leq y < 1$), $Pb(Mg_{1/3}Nb_{2/3})O_3$—$PbTiO_3$ ("PMN-PT"), $Li_3PO_4$, $Li_xTi_y(PO_4)_3$, (where $0 < x < 2$ and $0 < y < 3$, $Li_xAl_yTi_z(PO_4)_3$, (where $0 < x < 2$, $0 < y < 1$, and $0 < z < 3$), $Li_{1+x+y}(Al_zGa_{1-z})_x(Ti_zGe_{1-z})_{2-x}Si_yP_{3-y}O_{12}$, (where $0 \leq x \leq 1$, $0 \leq y \leq 1$, $0 < z < 1$, and $0 < z' \leq 1$), $Li_xLa_yTiO_3$, (where $0 < x < 2$ and $0 < y < 3$), $Li_xGe_yP_zS_w$, (where $0 < x < 4$, $0 < y < 1$, $0 < z < 1$, and $0 < w < 5$), $Li_xN_y$, (where $0 < x < 4$ and $0 < y < 2$), $SiS_2$, $Li_xSi_yS_z$, (where $0 \leq x < 3$, $0 < y < 2$, and $0 < z < 4$, $P_2S_5$, $Li_xP_yS_z$, (where $0 \leq x < 3$, $0 < y < 3$, and $0 < z < 7$), $Li_{3x}La_{2/3-x}TiO_3$, (where $0 \leq x \leq 1/6$), $Li_{1+y}Al_yTi_{2-y}(PO_4)_3$, (where $0 \leq y \leq 1$), $Li_{1+z}Al_2Ge_{2-z}(PO_4)_3$, (where $0 \leq z \leq 1$), $Li_2O$, LiF, LiOH, $Li_2CO_3$, $LiAlO_2$, $Li_2OAl_2O_3$—$SiO_2$—$P_2O_5$—$TiO_2$—$GeO_2$, $Li_{10}GeP_2S_{12}$, $Li_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiHf_2(PO_4)_3$, $LiZr_2(PO_4)_3$, $Li_2NH_2$, $Li_3(NH_2)_2I$, $LiBH_4$, $LiAH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, or $Li_2CdI_4$. However, the solid electrolyte layer is not limited thereto but may include at least one of a solid electrolyte of a sulfide-based solid electrolyte or an oxide-based solid electrolyte.

The solid electrolyte may further include a binder. Examples of the binder in the solid electrolyte may be at least one of styrene butadiene rubber ("SBR"), polytetrafluoroethylene, polyvinylidene fluoride, polyethylene. However, the binder is not limited thereto, and any suitable binder material may be used.

The solid electrolyte may further include an organic solid electrolyte. Examples of the organic solid electrolyte may include a polyethylene derivatives a polyethylene oxide derivative, a polypropylene oxide derivative, a phosphoric acid ester polymer, poly agitation lysine, polyester sulfide, polyvinyl alcohol, polyvinylidene fluoride, and polymers containing ionic dissociation groups. The solid electrolyte may further include an amorphous solid electrolyte. The solid electrolyte may include a mixed solid electrolyte, which is a combination of a crystalline solid electrolyte and an amorphous solid electrolyte. The solid electrolyte may further include at least one of a lithium salt or an ionic liquid.

The solid electrolyte may further include an ionically conductive inorganic material.

For example, the ionically conductive inorganic material may include at least one of a glass ion conductor, an amorphous metal ion conductor, a ceramic active metal ion conductor, and a glass-ceramic active metal ion conductor, but the ionically conductive inorganic material is not limited thereto, and any suitable ionically conductive inorganic material may be used. For example, the ionically conductive inorganic material may be an ionically conductive inorganic particle or a product thereof formed in a sheet form.

For example, the ionically conductive inorganic material may be at least one of $BaTiO_3$, $Pb(Zr_xTi_{1-x})O_3$ (wherein $0 < z \leq 1$, "PZT"), $Pb_{1-x}La_xZr_{1-y}Ti_yO_3$ ("PLZT") (where $0 \leq x < 1$ and $0 \leq y < 1$), $Pb(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, where $0 < x < 2$ and $0 < y < 3$), lithium aluminum titanium phosphate ($Li_xAl_yTi_z(PO_4)_3$, where $0 < x < 2$, $0 < y < 1$, and $0 < z < 3$), $Li_{1+x+y}(Al_zGa_{1-z})_x(Ti_zGe_{1-z})_{2-x}Si_yP_{3-y}O_{12}$ (where $0 \leq x \leq 1$, $0 \leq y \leq 1$, $0 < z < 1$, and $0 < z' 1$), lithium lanthanum titanate ($Li_xLa_yTiO_3$, where $0 < x < 2$ and $0 < y < 3$), lithium germanium thiophosphate ($Li_xGe_yP_zS_w$, where $0 < x < 4$, $0 < y < 1$, $0 < z < 1$, and $0 < w < 5$), lithium nitride ($Li_xN_y$, where $0 < x < 4$ and $0 < y < 2$), $SiS_2$-based glass ($Li_xSi_yS_z$, where $0 < x < 3$, $0 < y < 2$, and $0 < z < 4$), $P_2S_5$-based glass ($Li_xP_yS_z$, where $0 < x < 3$, $0 < y < 3$, and $0 < z < 7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, or a garnet-based ceramic ($Li_{3+x}La_3M_2O_{12}$, where M=Te, Nb, or Zr).

The solid electrolyte may be in a powder form or a mold form. The solid electrolyte in a mold form may be, for example, in the form of a pellet, a sheet, or a thin film, but solid electrolyte is not limited thereto, and the solid electrolyte may be in various forms according to its purpose of use.

A thickness of the solid electrolyte layer may be in a range of about 10 micrometers (μm) to about 1 millimeter (mm). The solid electrolyte layer may be in a single layer or multilayers.

The solid electrolyte layer may be prepared by deposition using a suitable method for layer formation, such as aerosol deposition, cold spraying, or sputtering. In an embodiment, the solid electrolyte may be prepared by pressurizing a solid electrolyte single particle. In an embodiment, the solid electrolyte layer may be prepared by mixing a solid electrolyte, a solvent, and a binder followed by coating, drying, and pressurizing.

An interfacial resistance between lithium metal and the protective layer and an interfacial resistance between the solid electrolyte layer and lithium metal of a lithium symmetric cell, in which the protective layer and the solid electrolyte layer are arranged between lithium metal, measured in an impedance spectrum at 25° C. and in a frequency range of about 1 hertz (Hz) to about $10^6$ Hz is about 30 ohms square centimeters ($\Omega \cdot cm^2$) or less. In an embodiment, each of an interfacial resistance between lithium metal and the protective layer and an interfacial resistance between the solid electrolyte layer and lithium metal of a lithium symmetric cell, in which the protective layer and the solid electrolyte layer are arranged between lithium metal, measured in an impedance spectrum at 25° C. and in a frequency range of about 1 Hz to about $10^6$ Hz is greater than 0 to about 30 $\Omega \cdot cm^2$.

The anode layer may include an anode current collector and an anode active material layer, wherein the anode active material layer may be a lithium metal layer or a lithium alloy layer.

Materials that constitute the anode current collector may include copper (Cu), stainless steel, titanium (Ti), iron (Fe), cobalt (Co), or nickel (Ni). The anode current collector may be formed of one of these metals, an alloy of two or more of these metals, or a coating material. The anode current collector may be, for example, formed in a plate shape or foil shape.

A thin film may be formed on a surface of the anode current collector. The thin film may include an element alloyable with lithium. Examples of an element alloyable with lithium may include gold (Au), silver (Ag), zinc (Zn), tin (Sn), indium (In), silicon (Si), aluminum (Al), and bismuth (Bi). The thin film may include a metal of these metals or an alloy of various combinations of these metals.

A thickness of the thin film may be in a range of about 1 nm to about 500 nm, but the thickness of the thin film is not limited thereto. When the thickness of the thin film is within this range, a precipitation amount of lithium in the anode layer may be appropriate while sufficiently exhibiting functions by the thin film, which results in excellent characteristics of an all-solid secondary battery. The thin film may be formed on the anode current collector using a vacuum-deposition method, a sputtering method, or a coating method such as a plating method.

As a material that forms a lithium alloy layer of the anode active material layer, an alloy including lithium and at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), and or (Zn) may be used. However, the material that forms a lithium alloy layer of the anode active material layer is not limited thereto, and any suitable metal or metalloid capable of forming an alloy with lithium may be used.

The anode active material layer may include appropriately mixed additives such as at least one of an ion conducting agent, a binder, a filler, a dispersant, or an ionic conductive agent.

The electrochemical device may include a lithium battery, an image sensor, or a semiconductor device. However, the electrochemical device is not limited thereto, and any suitable electrochemical device may be used.

For example, the electrochemical device may be an all-solid secondary battery or a metal air battery. For example, the electrochemical device may be an all-solid secondary battery.

Figure 3:
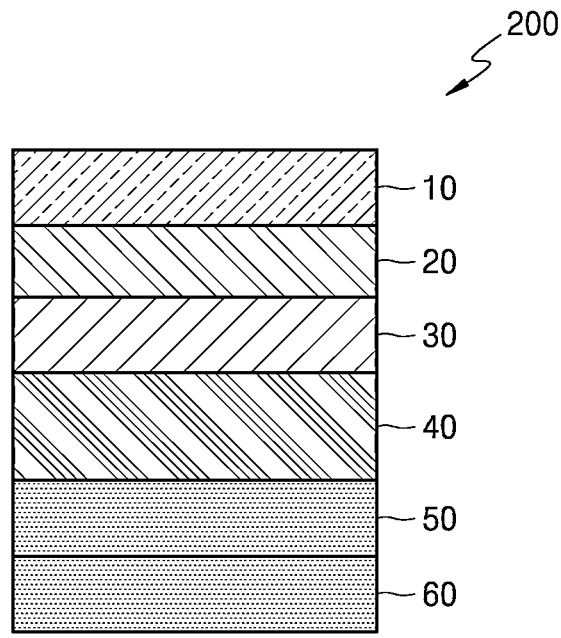
FIG. 3 is a schematic cross-sectional view of an embodiment of an all-solid secondary battery.
Figure 4:
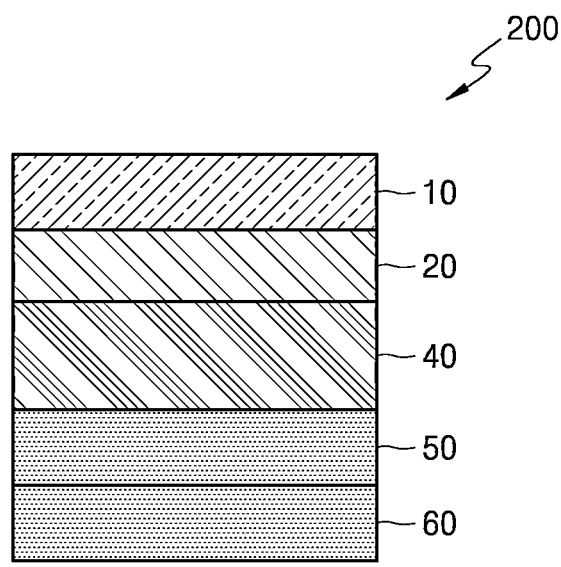
FIG. 4 is a schematic cross-sectional view of an all-solid secondary battery according to a comparative embodiment.

FIG. 3 is a schematic cross-sectional view of an all-solid secondary battery according to an embodiment. FIG. 4 is a schematic cross-sectional view of an all-solid secondary battery according to an embodiment for comparison. Referring to FIG. 3, an all-solid secondary battery 200 has a structure including a cathode current collector 60 and a cathode active material layer 50, as a cathode layer; a solid electrolyte layer 40; and a protected anode layer including an anode current collector 10, an anode active material layer 10, and a protective layer 30 on the anode active material layer 20, as an anode layer, in the stated order. Referring to FIG. 4, an all-solid secondary battery 200 has the same structure as the structure of the all-solid secondary battery 200 of FIG. 3, except that the anode layer does not include a protective layer 30.

The all-solid secondary battery 200 of FIG. 3 has reduced interfacial resistance between the anode layer and the solid electrolyte layer 40 and improved electrochemical characteristics such as an increase in electrochemical stability and an increase in discharge capacity by including the protective layer 30 including an oxide represented by Formula 1 in the anode layer as compared to those of the all-solid secondary battery 200 of FIG. 4.

The cathode current collector 60 may be prepared using a plate or a foil formed of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 60 may be omitted.

The cathode active material layer 50 may include at least one of a cathode active material or a solid electrolyte. The solid electrolyte in the cathode layer may be identical to or different from a solid electrolyte in the solid electrolyte layer 40. The solid electrolyte layer may include at least one of a solid electrolyte of a sulfide-based solid electrolyte or an oxide-based solid electrolyte.

The cathode active material may be a cathode active material capable of reversibly absorbing and desorbing lithium ions. The cathode active material may be at least one of a lithium transition metal oxide, a lithium transition metal phosphate, or a sulfide. Examples of the cathode active material may include a lithium cobalt oxide ("LCO"), a lithium nickel oxide, a lithium nickel cobalt oxide, a lithium nickel cobalt aluminum oxide ("NCA"), a lithium nickel cobalt manganese oxide ("NCM"), a lithium manganate, a lithium iron phosphate, a nickel sulfide, a copper sulfide, a lithium sulfide, an iron oxide, and a vanadium oxide. The cathode active material may be used alone or in a mixture of at least two cathode active materials. For example, the cathode active material may be formed of a lithium salt of a ternary transition metal oxide such as $LiNi_xCo_yAl_zO_2$ ("NCA") or $LiNi_xCo_yMn_zO_2$ ("NCM") (where $0<x<1$, $0<y<1$, $0<z<1$, and $x+y+z=1$).

A coating layer may be formed on the cathode active material. The coating layer may be formed using any material suitable for use as a coating layer of a cathode active material of an all-solid secondary battery. A material for the coating layer may be, for example, $Li_2O$—$ZrO_2$.

Also, when the cathode active material is formed of a lithium salt of a ternary transition metal oxide such as NCA or NCM and includes nickel (Ni) as a cathode active material, a capacity density of the all-solid secondary battery 200 may be increased, which may reduce metal deposition on the cathode active material when the battery is in a charged state. The all-solid secondary battery 200 may have enhanced long-term reliability in a charged state and improved cycle characteristics.

The cathode active material may be in the form of a particle having an oval shape or a spherical shape. A particle diameter of the cathode active material is not particularly limited but may be in a range applicable to a cathode active material of the all-solid secondary battery 200. An amount of the cathode active material of the cathode layer is not particularly limited and may be in a range applicable to a cathode layer of the all-solid secondary battery 200.

The cathode layer may further include an ionically conductive inorganic material. The ionically conductive inorganic material is the same as defined herein, and thus the description of the ionically conductive inorganic material is omitted.

The cathode layer may include appropriately mixed additives such as at least one of a conducting agent, a binder, a filler, a dispersant, or an ionic conductive agent in addition to at least one of the cathode active material or the solid electrolyte.

Examples of the conducting agent that may be added to the cathode layer may include graphite, carbon black, acetylene black, ketjen black, carbon fiber, or metal powder. Examples of the binder that may be added to the cathode layer may include styrene butadiene rubber ("SBR"), polytetrafluoroethylene, polyvinylidene fluoride, or polyethylene. The coating agent, the dispersant, and the ion conducting agent that may be appropriately added to the cathode layer may be materials suitable for use in an electrode of an all-solid secondary battery.

The solid electrolyte layer 40 and the protected anode layer are the same as described herein, and thus the descriptions thereof are omitted.

Method of Preparing Electrochemical Device

A method of preparing an electrochemical device according to an aspect of an embodiment includes depositing an oxide represented by Formula 1 on an anode active material layer to prepare a protected anode:

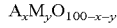

Formula 1

In Formula 1,

A is at least one of Ge, Sb, Bi, Se, Sn, or Pb,

M is at least one of In, TI, Sb, Bi, S, Se, Te, or Po,

A and M are different from each other, and $0<x<100$ and $0<y<100$.

The depositing of the oxide may be performed by, for example, physical chemical vapor deposition.

Examples of the physical chemical vapor deposition may include sputtering, pulsed laser deposition ("PLD"), molecular beam epitaxy ("MBE"), ion plating, and ion beam deposition.

Examples of the sputtering for the depositing of the oxide may include, for example, direct current ("DC") sputtering, radio frequency ("RF") sputtering, magnetron sputtering, bias sputtering, or reactive sputtering. In an embodiment, the depositing of the oxide may be performed by RF sputtering.

A material of a substrate is not particularly limited, and, for example, various supports such as a substrate or an anode electrode may be used according to a manufacture process.

A method of forming a protective layer by RF sputtering, according to an embodiment, may be as follows.

The sputtering may be performed using $O_2$ gas and a sputter target including at least one element A and at least one element M, wherein A and M are different from each other.

The sputtering may be performed at RF power of about 300 watts (W) to about 500 W, a power density of about 2.5 watts per square centimeter (W/cm 2) to about 2.6 W/cm$^2$, and a working pressure of about 3 millitorr (mTorr) to about 9 mTorr, where the plasma gas atmosphere may include nitrogen gas or argon gas. Also, a growth rate at which the protective layer is formed on a support plate may be controlled to be from about angstroms per second (Å/sec) to about 0.4 Å/sec. A distance between the sputter target and a substrate may be from about 50 millimeters (mm) to about 120 mm, and a deposition time may be from about 1 minute to about 100 minutes. When the sputtering conditions satisfy the disclosed ranges, a compact protective layer may be formed on the anode active material layer.

One or more example embodiments will now be described in further detail with reference to the following examples and comparative examples. These examples are for illustrative purposes only and are not intended to limit the scope of the one or more embodiments.

EXAMPLES

Preparation of Protected Anode/Anode

Example 1: Preparation of Protected Anode

A lithium metal layer having a lithium foil having a thickness of about 20 micrometers (μm) stacked on a Cu current collector was formed. A protected anode in which an amorphous $Ge_{46.65}Te_{46.27}O_{7.08}$ protective layer having a thickness of about 100 nanometers (nm) was formed on the lithium metal layer by radio frequency ("RF") sputtering using a GeTe target and $O_2$ gas under the process conditions according to Table 1 was prepared.

TABLE 1

| Category | Condition |
| --- | --- |
| RF power | 200 watts (W) |
| Driving pressure | 8 millitorr (mTorr) |
| $N_2$ gas | 50% |
| $O_2$ gas | 50% |
| Growth rate | 0.5 angstroms per second (Å/sec) |
| Driving substrate temperature | 25° C. |

Example 2: Preparation of Protected Anode

A protected anode having an amorphous $Ge_{46.65}Te_{46.27}O_{7.08}$ protective layer having a thickness of about 100 nm on the lithium metal layer was prepared in the same manner as in Example 1, except that RF sputtering was performed at a driving substrate temperature of about 100° C.

Example 3: Preparation of Protected Anode

A protected anode having an amorphous $Ge_{46.65}Te_{46.27}O_{7.08}$ protective layer having a thickness of about 100 nm on the lithium metal layer was prepared in the same manner as in Example 1, except that RF sputtering was performed at a driving substrate temperature of about 200° C.

Example 4: Preparation of Protected Anode

A protected anode having a crystalline $Ge_{46.65}Te_{46.27}O_{7.08}$ protective layer having a thickness of about 100 nm on the lithium metal layer was prepared in the same manner as in Example 1, except that RF sputtering was performed at a driving substrate temperature of about 300° C.

Example 5: Preparation of Protected Anode

A protected anode having a crystalline $Ge_{46.65}Te_{46.27}O_{7.08}$ protective layer having a thickness of about 100 nm on the lithium metal layer was prepared in the same manner as in Example 1, except that RF sputtering was performed at a driving substrate temperature of about 400° C.

Comparative Example 1: Preparation of Anode

A lithium metal layer having a lithium foil having a thickness of about 20 μm stacked on a Cu current collector was prepared as an anode.

Preparation of all-solid secondary battery (lithium symmetric half-cell)

Example 6: Preparation of all-Solid Secondary Battery (Lithium Symmetric Half-Cell)

A $Li_7La_3Zr_2O_{12}$ ("LLZO") solid electrolyte layer having a thickness of about 5 μm was disposed between the protected anode prepared in Example 1 and a lithium metal layer (having a thickness of about 20 μm) to prepare an all-solid secondary battery of Li/$Ge_{46.65}Te_{46.27}O_{7.08}$ protective layer/LLZO/Li (lithium symmetric half-cell).

Examples 7 to 10: Preparation of all-Solid Secondary Battery (Lithium Symmetric Half-Cell)

All-solid secondary batteries (lithium symmetric half-cells) of Li/$Ge_{46.65}Te_{46.27}O_{7.08}$ protective layer/LLZO/Li were prepared in the same manner as in Example 6, except that the protected anodes prepared in Examples 2 to 5 were used, respectively, instead of the protected anode prepared in Example 1.

Comparative Example 2: Preparation of all-Solid Secondary Battery (Lithium Symmetric Half-Cell)

An all-solid secondary battery (lithium symmetric half-cell) of Li/LLZO/Li was prepared in the same manner as in Example 6, except that the anode prepared in Comparative Example 1 was used.

Preparation of all-Solid Secondary Battery (Full-Cell)

Example 11: Preparation of all-Solid Secondary Battery (Full-Cell)

Preparation of Stack of LLZO Solid Electrolyte Layer/Protected Anode Layer

A $Li_7La_3Zr_2O_{12}$ ("LLZO") pellet having a thickness of about 5 μm was prepared. The protected anode prepared in Example 1 was disposed on one surface of the LLZO pellet and pressed at a pressure of about 250 MPa and a temperature of about 25° C. by cold isostatic pressing ("CIP") to attach a protected anode layer to the LLZO pellet, and thus a stack of the LLZO solid electrolyte layer/protected anode layer was prepared.

Preparation of Cathode Layer $LiNi_{0.33}Co_{0.33}Mn_{0.33}O_2$ ("NCM") was prepared as a cathode active material. In addition, polytetrafluoroethylene (Teflon™ binder available from DuPont) was prepared as a binder. Also, carbon nanofibers ("CNFs") were prepared as a conducting agent. Subsequently, these materials were mixed in a weight ratio of cathode active material:conducting agent:binder=100:2:1. The mixture was molded into a sheet type, thereby completing the fabrication of a cathode active material sheet. In addition, the cathode active material sheet was pressed on a cathode current collector formed of an aluminum foil having a thickness of about 18 micrometers (μm) to prepare a cathode layer. The cathode active material layer of the cathode layer was impregnated with an electrolyte solution including 2.0 molar (moles per liter (M)) lithium bis(fluorosulfonyl)imide ("LiFSI") dissolved in an ionic liquid, N-propyl-N-methyl-pyrrolidinium bis(fluorosulfonyl)imide ("Pyr13FSI").

Preparation of all-Solid Secondary Battery (Full-Cell)

The cathode layer was disposed such that the cathode active material layer impregnated with the ionic liquid electrolyte solution faced toward an upper end in a stainless steel ("SUS") cap. The stack of the solid electrolyte layer/protected anode layer was disposed such that the solid electrolyte layer was placed on the cathode active material layer, and then sealed to manufacture an all-solid secondary battery (full-cell).

The cathode layer and the anode layer were insulated using an insulator. A part of the cathode current collector and a part of the anode current collector protruded out of the sealed battery were used as a cathode layer terminal and an anode layer terminal, respectively.

Examples 12 to 15: Preparation of all-Solid Secondary Battery (Full-Cell)

All-solid secondary batteries (full-cells) were each prepared in the same manner as in Example 11, except that the protected anodes prepared in Examples 2 to 5 were used, respectively, instead of the protected anode prepared in Example 1 during preparation of a LLZO solid electrolyte layer/protected anode layer stack.

Comparative Example 3: Preparation of all-Solid Secondary Battery (Full-Cell)

An all-solid secondary battery (full-cell) was prepared in the same manner as in Example 11, except that a LLZO solid electrolyte layer/anode layer stack was prepared using the anode prepared in Comparative Example 1 instead of the protected anode prepared in Example 1.

Analysis Example 1: Scanning Electron Microscope ("SEM") Image

A scanning electron microscope ("SEM") image of the all-solid secondary battery (lithium symmetric half-cell) prepared in Example 6 was taken. The SEM image was taken using S-4700 FE-SEM (available from Hitachi). The result is shown in FIG. 5.

Figure 5:
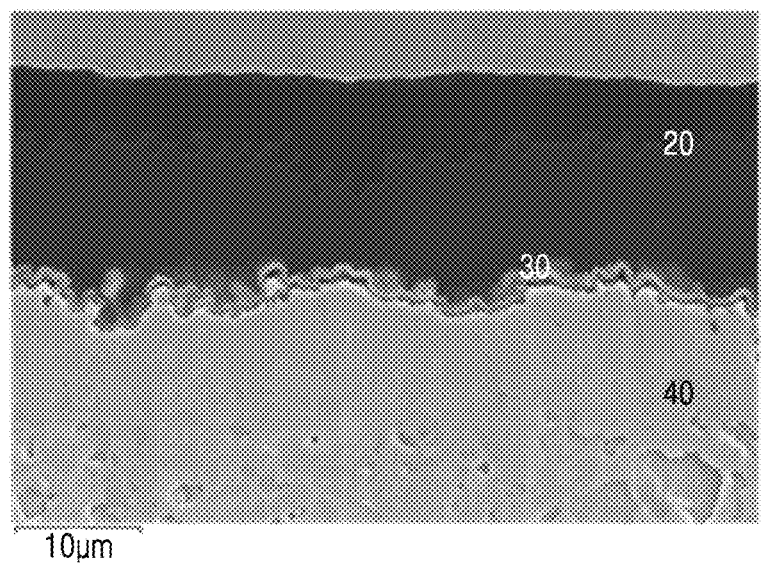
FIG. 5 is a scanning electron microscope ("SEM") image of a $Li_7La_3Zr_2O_{12}$ ("LLZO") solid electrolyte layer/protected anode layer stack of an all-solid secondary battery prepared in Example 6.

Referring to FIG. 5, it may be confirmed that the all-solid secondary battery prepared in Example 6 has a $Ge_{46.65}Te_{46.27}O_{7.08}$ protective layer 30 located between a lithium anode layer (e.g., anode active material layer 20, the second layer from the top) and a LLZO solid electrolyte layer 40 (the first layer from the bottom).

Analysis Example 2: X-Ray Diffraction ("XRD") Test

An XRD spectrum test using a CuKα ray was performed on the protective layers of the protected anodes prepared in Examples 1 to 5. The XRD spectrum test was performed at a rate of 5°/minute in a range where a diffraction angle 2θ was from about 20° to about 60°. As an XRD analyzer, Rigaku RINT2200HF+ diffractometer using CuKα radiation (1.540598 Å) was used. The results are shown in FIG. 6.

Figure 6:
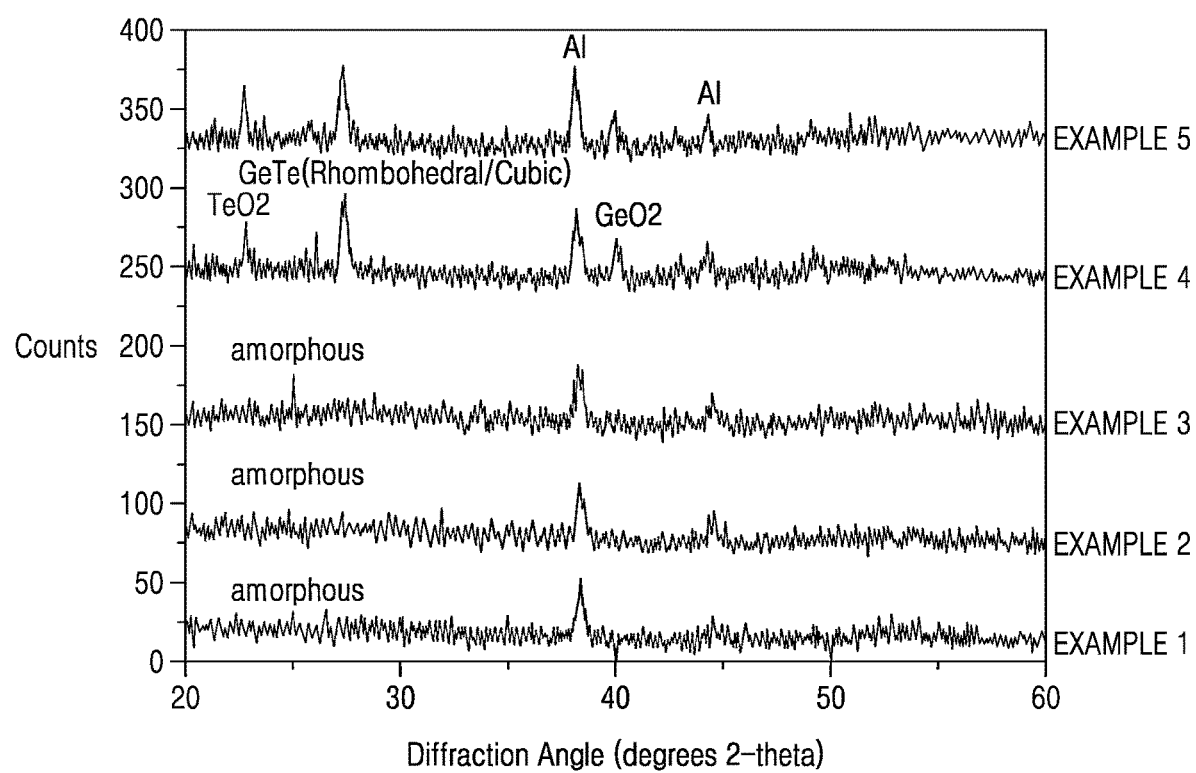
FIG. 6 is a graph of Counts versus Diffraction Angle (degrees 2 theta) showing the results of an X-ray diffraction ("XRD") spectrum test performed on protective layers of protected anodes prepared in Examples 1 to 5.

Referring to FIG. 6, significant diffraction peaks in a diffraction angle 2θ range of about 25°±5° were not observed from the protective layers of the protected anodes prepared in Examples 1 to 3, whereas the protective layers of the protected anodes prepared in Examples 4 and 5 had two significant diffraction peaks including the $TeO_2$ diffraction peak in the same diffraction angle 2θ range. In this regard, it may be confirmed that the protective layers of the protected anodes prepared in Examples 1 to 3 had an amorphous phase, and that the protective layers of the protected anodes prepared in Examples 4 and 5 had a crystalline phase.

Analysis Example 3: X-Ray Photoelectron Spectroscopy/Auger Electron Spectroscopy ("XPS/AES") Test (1) X-Ray Photoelectron Spectroscopy ("XPS") Test An XPS test was performed on the protective layer of the protected anode prepared in Example 1. As an XPS analyzer, Quantum 2000 Scanning ESCA Microprobe (available from Physical Electronics) was used, and a monochromatized Al—Kα was used as an X-ray source (1,486.6 electronvolts (eV), 27.7 W). The results are shown in FIGS. 7A to 7C.

Figure 7A:
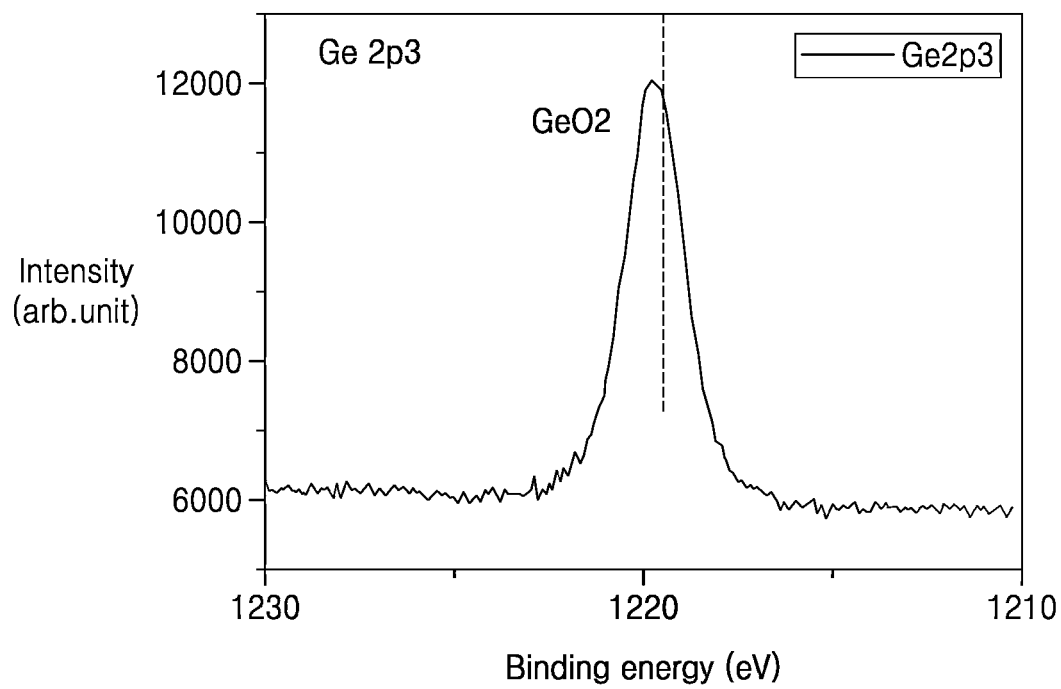
FIG. 7A is a graph of Intensity (arbitrary units (arb. unit)) versus Binding energy (electronvolts (eV)) showing the results of an X-ray photoelectron spectroscopy ("XPS") test performed on Ge2p3, with respect to the protective layer of a protected anode prepared in Example 1.
Figure 7B:
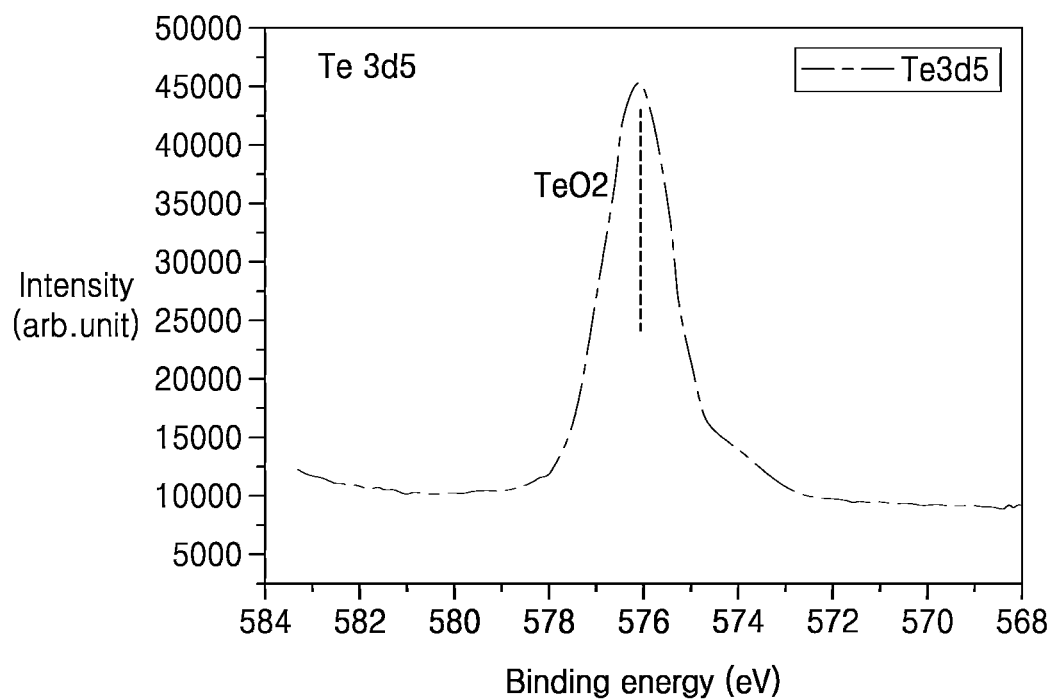
FIG. 7B is a graph of Intensity (arb. unit) versus Binding energy (eV) showing the results of an XPS test performed on Te3d5, with respect to the protective layer of a protected anode prepared in Example 1.
Figure 7C:
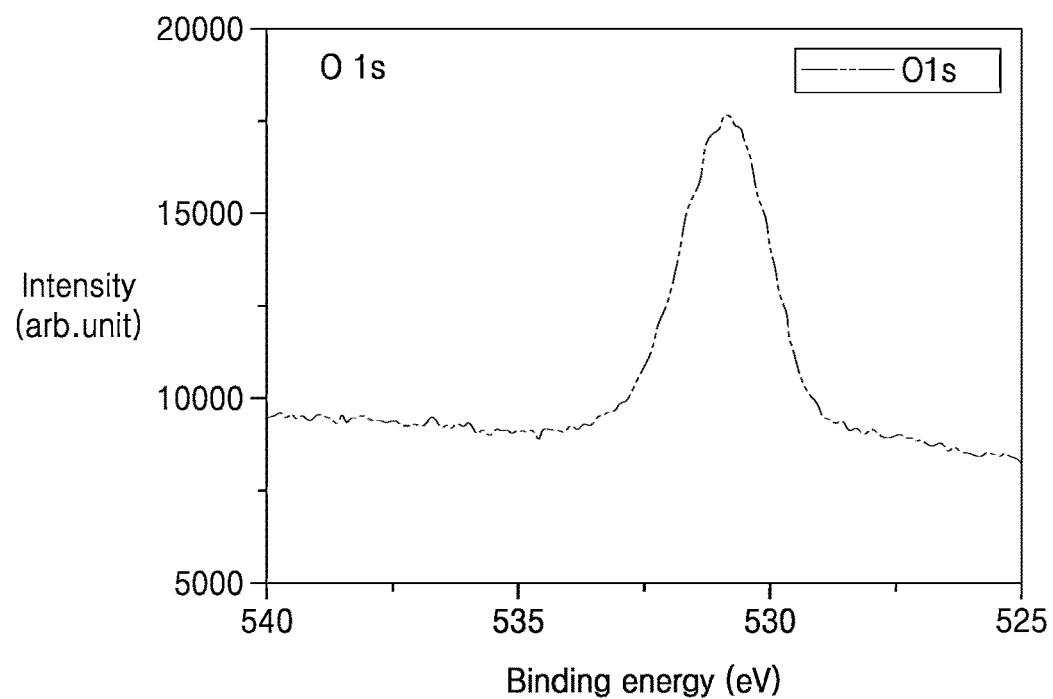
FIG. 7C is a graph of Intensity (arb. unit) versus Binding energy (eV) showing the results of an XPS test performed on O1s, with respect to the protective layer of a protected anode prepared in Example 1.

Referring to FIGS. 7A to 7C, the protective layer of the protected anode prepared in Example 1 had $GeO_2$, $TeO_2$, and $O_2$ peaks at regions where the binding energy was about 1,220 eV, about 576 eV, and about 532 eV.

Also, amounts of O1s, Ge2p3, and Te3d5 in the protective layer of the protected anode prepared in Example 1 were calculated from the XPS analysis results of FIGS. 7A to 7C. The results are shown in Table 2.

TABLE 2

| Material | O1s | Ge2p3 | Te3d5 |
|---|---|---|---|
| Amount (atomic percent (at %)) | 7.08 | 46.65 | 46.27 |

Referring to Table 2, it may be confirmed that a composition of the protective layer of the protected anode prepared in Example 1 was $Ge_{46.65}Te_{46.27}O_{7.08}$.

(2) Auger Electron Spectroscopy ("AES") Test

An AES test for analyzing amounts of O, Si, Ge, and Te elements when the protective layer was deposited on the lithium metal layer prepared in Comparative Example 1 by RF sputtering using a GeTe target and $O_2$ gas for 0 minutes to about 50 minutes. As an AES analyzer, PHI 710 (available from Physical Electronics) was used. The results are shown in FIG. 8.

Figure 8:
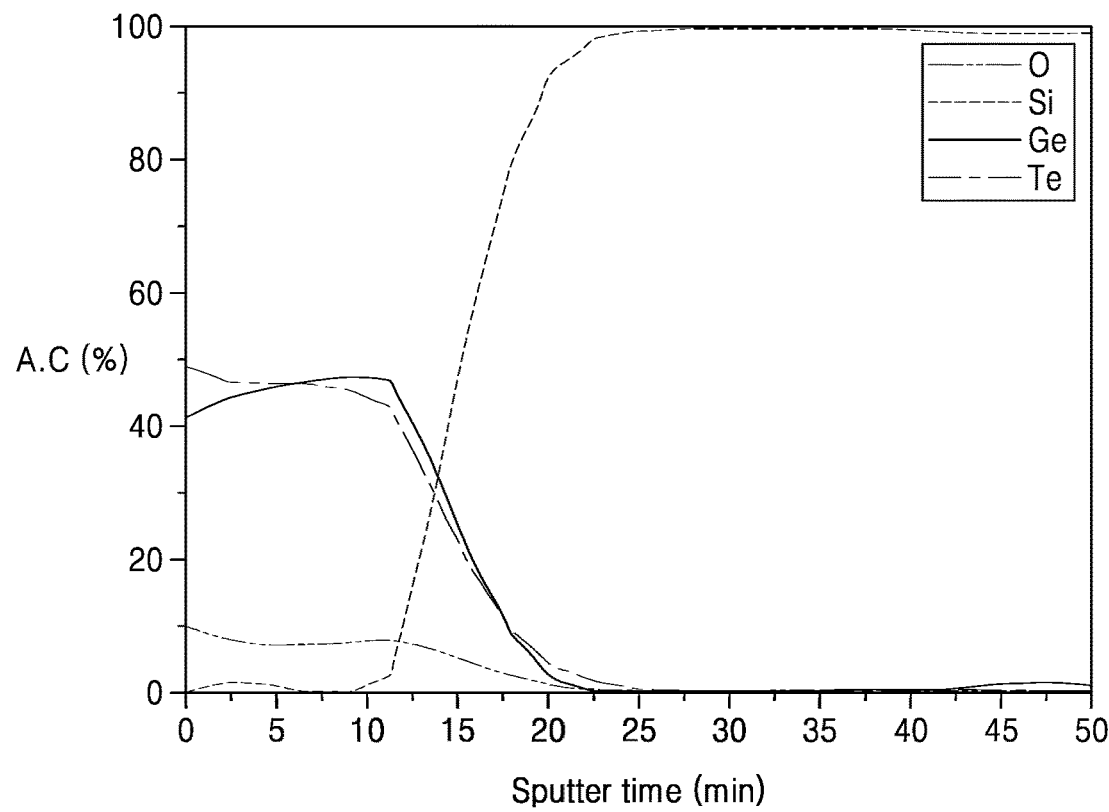
FIG. 8 is a graph of Atomic Content (A.C) (percent (%)) versus Sputter time (minutes (min)) showing the results of an auger electron spectroscopy ("AES") test analyzing amounts of O, Si, Ge, and Te elements according to time when forming a protective layer by radio frequency ("RF") sputtering deposition using a GeTe target and $O_2$ gas on a lithium metal layer prepared in Comparative Example 1.

Referring to FIG. 8, it may be confirmed that most of the $Ge_{46.65}Te_{46.27}O_{7.08}$ protective layer having a thickness of about 100 nm was formed on the lithium metal layer when the protective layer was deposited on the lithium metal layer prepared in Comparative Example 1 by RF sputtering using a GeTe target and $O_2$ gas for 0 minutes to about 50 minutes. Since oxygen element was formed in the protective layer in even content during the sputtering of about 20 minutes, and that a content of oxygen element formed in the protective layer was uniform during the sputtering from 0 minutes to about 10 minutes, it may be determined that oxygen is uniformly distributed on the surface and inside of the protective layer.

Figure 9:
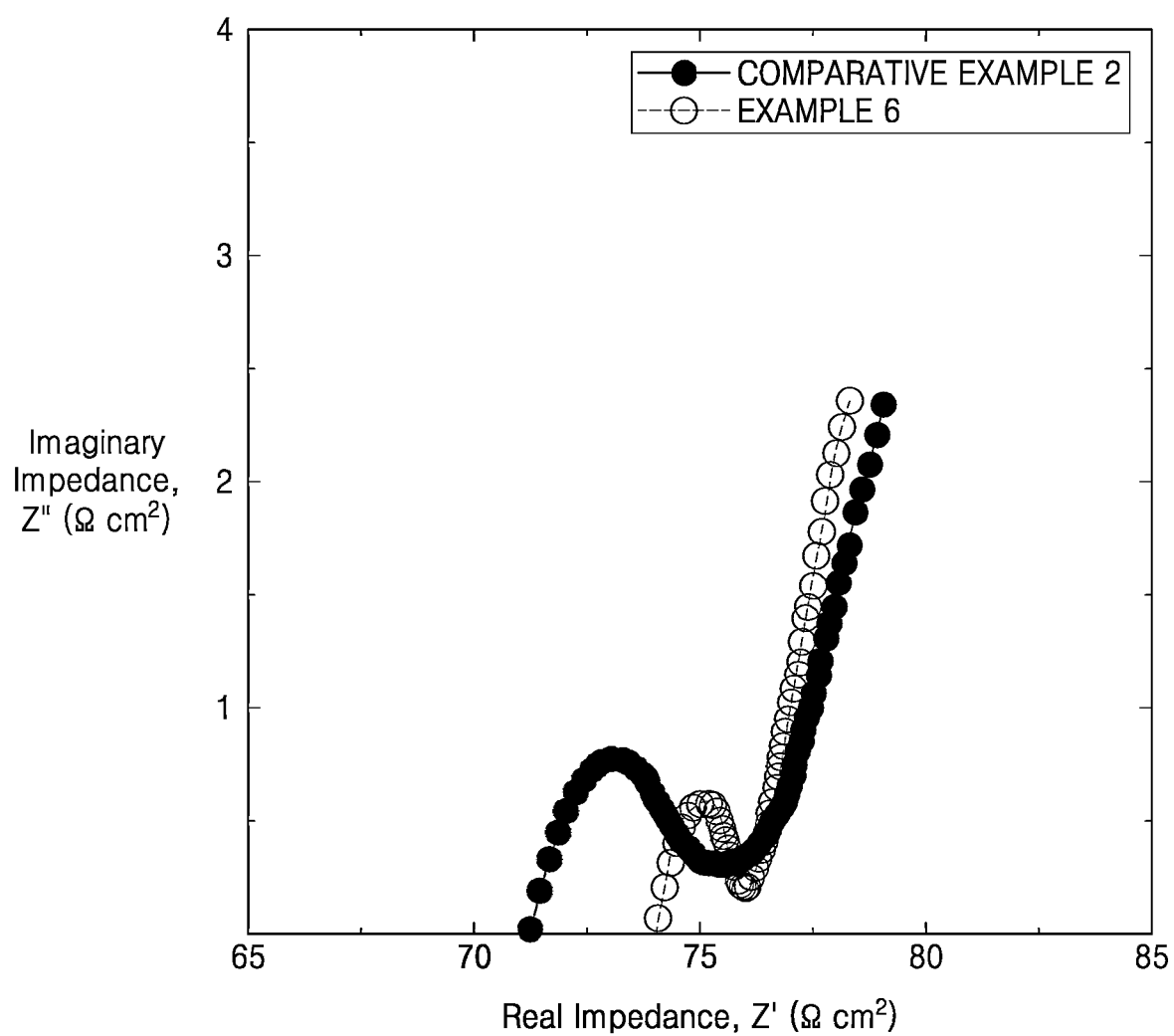
FIG. 9 is a graph of Imaginary Impedance Z" (ohms square centimeters (Ω cm 2)) versus Real Impedance Z' (Ω cm 2) showing Nyquist plot results showing interfacial resistance characteristics of lithium symmetric cells prepared in Example 6 and Comparative Example 2.
Figure 10:
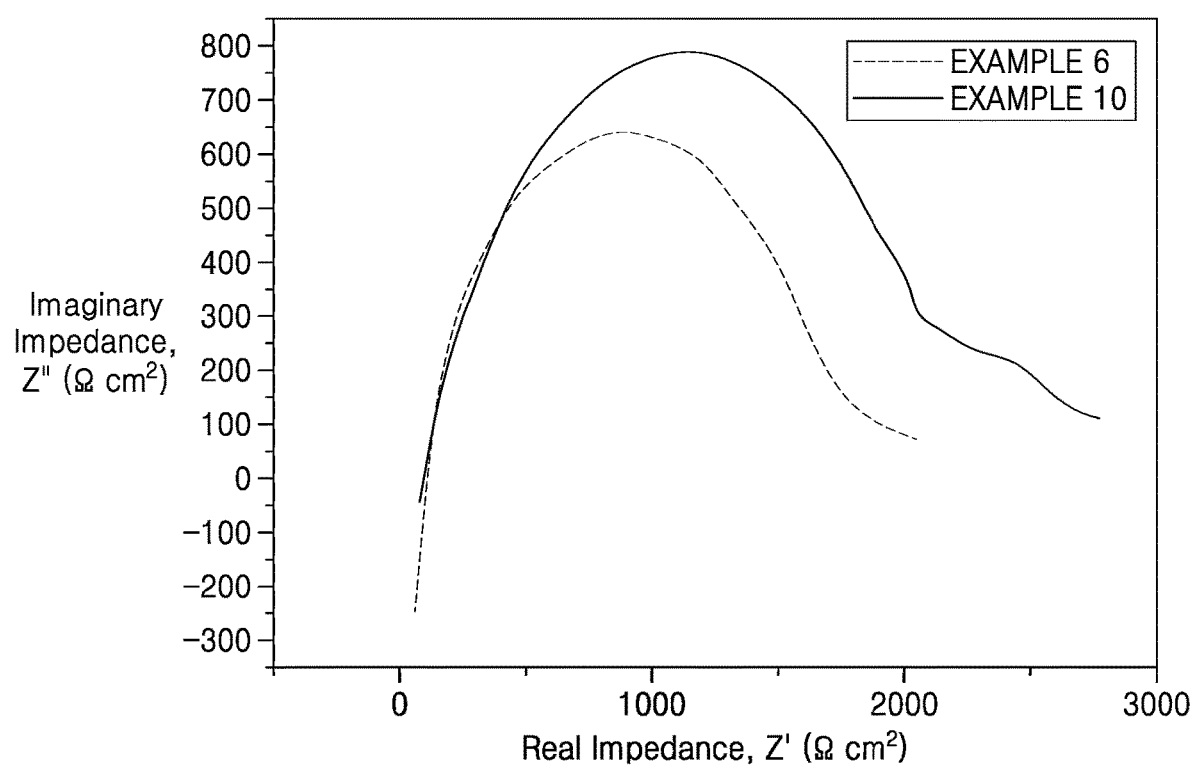
FIG. 10 is a graph of Imaginary Impedance Z" (Ω cm 2) versus Real Impedance Z' (Ω cm 2) showing Nyquist plot results showing interfacial resistance characteristics of lithium symmetric cells prepared in Example 6 and Example 10.

Evaluation Example 1: Impedance—Interfacial Resistance and Ion Conductivity (1) Interfacial Resistance Impedance characteristics of the all-solid secondary batteries (lithium symmetric half-cells) prepared in Examples 6 and 10 and Comparative Example 2 were evaluated at 25° C. The impedances were measured using a Solartron SI1260 impedance/frequency analyzer (frequency range: 1 megahertz (MHz) to 1 hertz (Hz), amplitude: 10 millivolts (mV)). The results are shown in FIGS. 9 and 10. In FIGS. 9 and 10, an interfacial resistance of the electrode is determined by the position and size of a semicircle. In this regard, a difference between a left x-axis intercept and a right x-axis intercept of the semicircle denotes the interfacial resistance at the electrode.

Referring to FIG. 9, the electrode resistance of the all-solid secondary battery (lithium symmetric cell) prepared in Example 6 decreased at 25° C. as compared to that of the all-solid secondary battery (lithium symmetric cell) prepared in Comparative Example 2. Referring to FIG. 10, the electrode resistance of the all-solid secondary battery (lithium symmetric cell) prepared in Example 6 decreased at 25° C. as compared to that of the all-solid secondary battery (lithium symmetric cell) prepared in Example 10.

(2) Ion Conductivity

The evaluation of the ionic conductivity of the all-solid secondary batteries (lithium symmetric half-cells) prepared in Example 6 and Example 10 was conducted by obtaining a resistance (R) from a circular arc in the Nyquist plot of FIG. 10 and correcting the electrode area and pellet thickness based on the resistance R. The results are shown in Table 3.

TABLE 3

|  | Ion conductivity (Siemens/centimeter (S/cm)) |
| --- | --- |
| Example 10 | $1.5 \times 10^{-5}$ |
| Example 6 | $3.84 \times 10^{-5}$ |

Referring to Table 3, ion conductivity of the all-solid secondary battery (lithium symmetric cell) prepared in Example 6 was improved at 25° C. as compared to that of the all-solid secondary battery (lithium symmetric cell) prepared in Example 10.

Evaluation Example 2: Electrochemical Characteristics (1) Electrochemical Stability Electrochemical stability of the all-solid secondary batteries (lithium symmetric half-cells) prepared in Comparative Example 2 and Example 6 were evaluated. The results are shown in FIGS. 11A and 11B.

The electrochemical stability test was performed using Solartron 1287A Potentiostat/Galvanostat. The electrochemical stability test was performed by placing each of the all-solid secondary batteries (lithium symmetric half-cells) in a thermostat bath at 25° C., charged at a constant current of 0.1 milliamperes per square centimeter ($mA/cm^2$), 0.2 $mA/cm^2$, 0.3 $mA/cm^2$, 0.4 $mA/cm^2$, and 0.5 $mA/cm^2$ for 1 hour and then discharged at the same constant current for 1 hour and 2 hours, and this process was repeated twice.

Figure 11A:
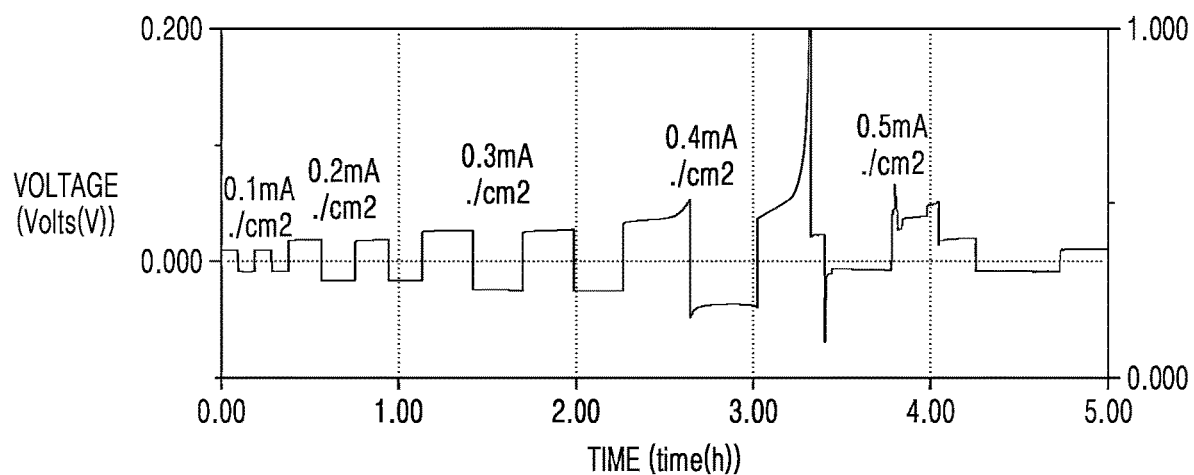
FIG. 11A is a graph of Voltage (volts (V)) versus time (hours (h)) showing the results of evaluating electrochemical stability of a lithium symmetric cell prepared in Comparative Example 2.
Figure 11B:
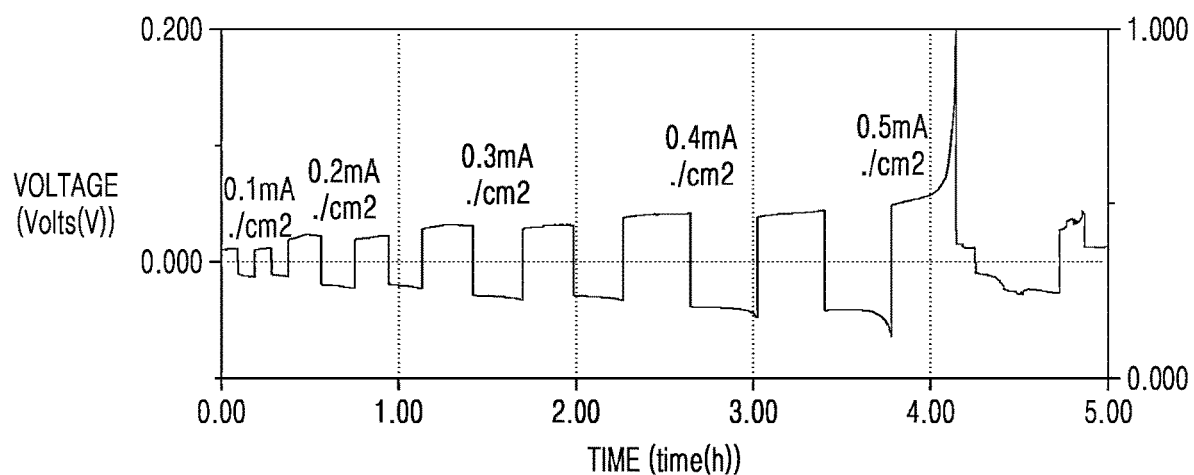
FIG. 11B is a graph of Voltage (V) versus time (hours (h)) showing the results of evaluating electrochemical stability of a lithium symmetric cell prepared in Example 6.

Referring to FIGS. 11A and 11B, the all-solid secondary battery (lithium symmetric half-cell) prepared in Example 6 had a short circuit occurred at 0.5 $mA/cm^2$, and the all-solid secondary battery (lithium symmetric half-cell) prepared in Comparative Example 2 had a short circuit occurred at 0.4 $mA/cm^2$. From this result, it may be confirmed that inhibition of short circuit occurrence 100 in the all-solid secondary battery (lithium symmetric half-cell) prepared in Example 6 was enhanced by about 0.1 $mA/cm^2$ as compared to the all-solid secondary battery (lithium symmetric half-cell) prepared in Comparative Example 2.

(2) Discharge Capacity Evaluation

Discharge capacities of the all-solid secondary batteries (full-cells) prepared in Example 11 and Comparative Example 3 were evaluated. A charging/discharging test for evaluation of the discharge capacities was performed at 25° C. A cut-off potential was in a range of about 4.3 volts (V) to about 2.5 V (vs. Li/Li$^+$), and a constant current of 0.1 C was supplied to the batteries. The batteries were discharged at a constant current of 0.1 C. Changes in voltage according to a discharge capacity per unit area of the all-solid secondary batteries (full-cells) are shown in FIG. 12.

Figure 12:
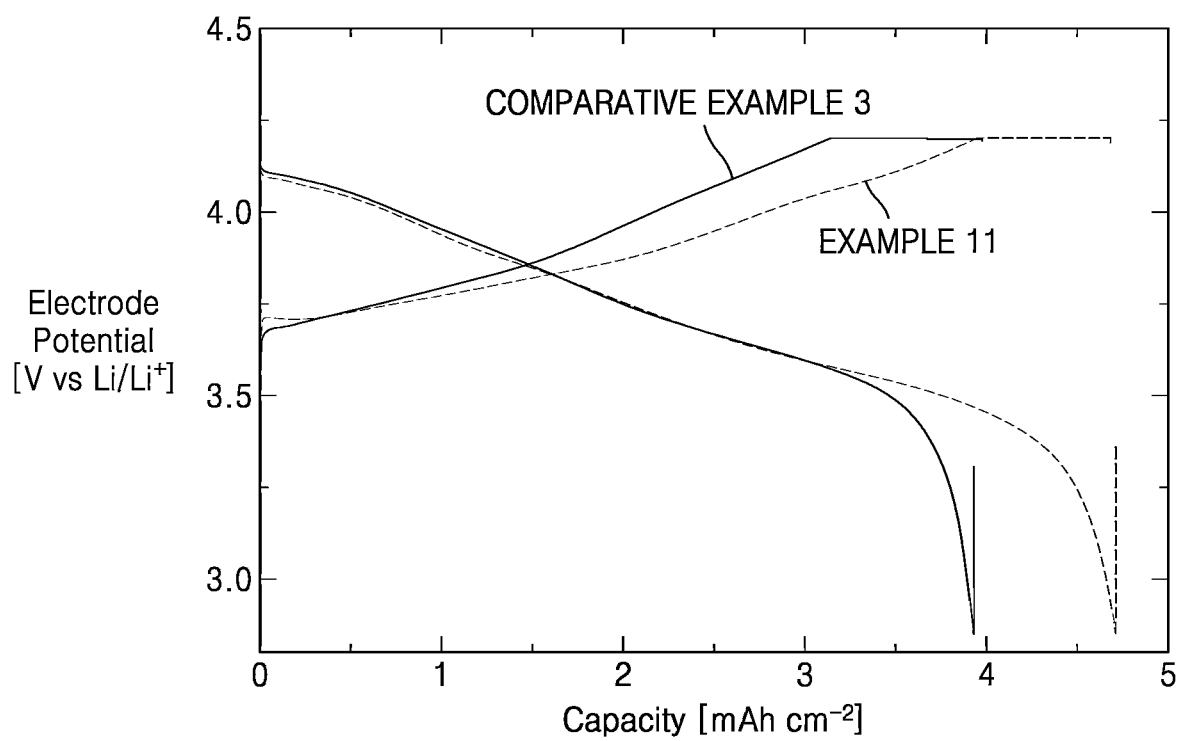
FIG. 12 is a graph of Electrode Potential [V vs Li/Li$^+$] versus Capacity (milliampere hours per square centimeter (mAh cm$^{-2}$)) showing the results of evaluating discharge capacity of all-solid secondary batteries (full-cells) prepared in Example 11 and Comparative Example 3.

Referring to FIG. 12, a capacity of the all-solid secondary battery (full-cell) prepared in Example 11 was increased about 10% to about 15% as compared to that of the all-solid secondary battery (full-cell) prepared in Comparative Example 3.

As described herein, a protected anode according to an aspect of one or more embodiment includes a protective layer including an oxide represented by Formula 1 on an anode layer. The protected anode decreases an interfacial resistance between the anode layer and an electrolyte layer and may improve electrochemical characteristics such as an increase in electrochemical stability and an increase in discharge capacity. The protected anode may be included in an electrochemical device including a lithium battery, an image sensor, or a semiconductor device.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A protected anode comprising:
   an anode layer; and
   a protective layer comprising an oxide represented by Formula 1 on the anode layer $$A_xM_yO_{100-x-y}$$ Formula 1 wherein, in Formula 1,
   A is at least one of Ge, Sb, Bi, Se, Sn, or Pb,
   M is at least one of In, Tl, Sb, Bi, S, Se, Te, or Po,
   A and M are different from each other, and
   $0<x<1000$ and $0<y<100$.

2. The protected anode of claim 1,
   wherein the protective layer comprises an oxide represented by Formula 2:

$$Ge_{x'}Te_{y'}O_{100-x'-y'}$$ Formula 2 wherein, in Formula 2, $0<x'<100$ and $0<y'<100$.

3. The protected anode of claim 1,
   wherein the protective layer comprises at least one of
   $Ge_{46.65}Te_{46.27}O_{7.08}$, $Ge_{46.65}In_{46.27}O_{7.08}$,
   $Ge_{46.65}Sb_{46.27}O_{7.08}$, $Ge_{46.65}S_{46.27}O_{7.08}$,
   $Sb_{46.65}Te_{46.27}O_{7.08}$, $Se_{46.65}Te_{46.27}O_{7.08}$ or
   $Ge_{46.65}Se_{46.27}O_{7.08}$.

4. The protected anode of claim 1,
   wherein the oxide represented by Formula 1 is amorphous.

5. The protected anode of claim 1,
   wherein the oxide present in the protective layer has a work function greater than a work function of lithium metal and has a band gap of about 1.5 electronvolts to about 3 electronvolts.

6. The protected anode of claim 1,
   wherein the oxide represented by Formula 1 is amorphous, wherein oxygen is uniformly distributed on a surface of the protective layer and inside of the protective layer.

7. The protected anode of claim 1,
   wherein a thickness of the protective layer is in a range of about 1 nanometer to about 1 micrometer.

8. The protected anode of claim 1,
   wherein the protective layer has an ion conductivity of about $1.5\times10^{-5}$ to about $1\times10^{-3}$ milliSiemens/centimeter at a temperature of about 25° C.

9. The protected anode of claim 1,
   wherein the anode layer comprises an anode current collector and an anode active material layer, and
   wherein the anode active material layer is a lithium metal layer or a lithium alloy layer.

10. An electrochemical device comprising:
    a cathode layer;
    a solid electrolyte layer; and
    a protected anode layer,
    wherein the solid electrolyte layer is between the cathode layer and the protected anode layer,
    wherein the protected anode layer comprises
    an anode layer; and
    a protective layer comprising an oxide represented by Formula 1, on the anode layer:

$$A_xM_yO_{100-x-y}$$ Formula 1 wherein, in Formula 1,
    A is at least one of Ge, Sb, Bi, Se, Sn, or Pb,
    M is at least one of In, Tl, Sb, Bi, S, Se, Te, or Po,
    A and M are different from each other, and
    $0<x<100$ and $0<y<100$.

11. The electrochemical device of claim 10,
    wherein the protective layer comprises an oxide represented by Formula 2:

$$Ge_{x'}Te_{y'}O_{100-x'-y'}$$ Formula 2 wherein, in Formula 2, $0<x'<100$ and $0<y'<100$.

12. The electrochemical device of claim 10,
    wherein the oxide of Formula 1 is amorphous.

13. The electrochemical device of claim 10,
    wherein the oxide present in the protective layer has a work function greater than a work function of lithium metal and has a band gap of about 1.5 electronvolts to about 3 electronvolts.

14. The electrochemical device of claim 10,
    wherein the oxide represented by Formula 1 is amorphous, wherein oxygen is uniformly distributed on a surface of the protective layer and inside of the protective layer.

15. The electrochemical device of claim 10,
    wherein a thickness of the protective layer is in a range of about 1 nanometer to about 1 micrometer.

16. The electrochemical device of claim 10,
    wherein the protective layer has an ion conductivity of about $1.5\times10^{-5}$ to about $1\times10^{-3}$ milliSiemens/centimeter at a temperature of about 25° C.

17. The electrochemical device of claim 10,
    wherein the solid electrolyte layer comprises at least one of $Li_{3+x}La_3M_2O_{12}$, wherein $0\leq x\leq5$, and M=Te, Nb, or Zr, $Li_{1+x+y}Al_xTi_{2-x}Si_yP_{3-y}O_{12}$, wherein $0<x<2$ and $0\leq y<3$, $BaTiO_3$, $Pb(Zr_zTi_{1-z})O_3$, wherein $0<z\leq1$, $Pb_{1-x}La_xZr_{1-y}Ti_yO_3$, wherein $0\leq x<1$ and $0\leq y<1$, $Pb(Mg_{1/3}Nb_{2/3})O_3$—$PbTiO_3$, $Li_3PO_4$, $Li_xTi_y(PO_4)_3$, wherein $0<x<2$ and $0<y<3$, $Li_xAl_yTi_z(PO_4)_3$, wherein $0<x<2$, $0<y<1$, and $0<z<3$, $Li_{1+x+y}(Al_zGa_{1-z})_x(Ti_zGe_{1-z})_{2-x}Si_yP_{3-y}O_{12}$, where $0\leq x\leq1$, $0\leq y\leq1$, $0<z\leq1$, and $0<z'\leq1$, $Li_xLa_yTiO_3$, wherein $0<x<2$ and $0<y<3$, $Li_xGe_yP_zS_w$, wherein $0<x<4$, $0<y<1$, $0<z<1$, and $0<w<5$, $Li_xN_y$, wherein $0<x<4$ and $0<y<2$, $SiS_2$, $Li_xSi_yS_z$, wherein $0\leq x<3$, $0<y<2$, and $0<z<4$, $P_2S_5$, $Li_xP_yS_z$, wherein $0\leq x<3$, $0<y<3$, and $0<z<7$, $Li_{3x}La_{2/3-x}TiO_3$, wherein $0\leq x\leq1/6$, $Li_{1+y}Al_yTi_{2-y}(PO_4)_3$, wherein $0\leq y\leq1$, $Li_{1+z}Al_2Ge_{2-z}(PO_4)_3$, wherein $0\leq z\leq1$, $Li_2O$, LiF, LiOH, $Li_2CO_3$, $LiAlO_2$, $Li_2OAl_2O_3$—$SiO_2$—$P_2O_5$—$TiO_2$—$GeO_2$, $Li_{10}GeP_2S_{12}$, $Li_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiHf_2(PO_4)_3$, $LiZr_2(PO_4)_3$, $Li_2NH_2$, $Li_3(NH_2)_2I$, $LiBH_4$, $LiAH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, or $Li_2CdI_4$.

18. The electrochemical device of claim 10,
    wherein each of an interfacial resistance between lithium metal and the protective layer and an interfacial resistance between the solid electrolyte layer and lithium metal of a lithium symmetric cell, in which the protective layer and the solid electrolyte layer are arranged between lithium metal, measured in an impedance spectrum at 25° C. and in a frequency range of about 1 hertz to about $10^6$ hertz is greater than 0 to about 30 ohms square centimeters.

19. The electrochemical device of claim 10,
    wherein the anode layer comprises an anode current collector and an anode active material layer, and wherein the anode active material layer is a lithium metal layer or a lithium alloy layer.

20. The electrochemical device of claim 10, wherein the electrochemical device comprises a lithium battery, an image sensor, or a semiconductor device.

21. The electrochemical device of claim 10, wherein the electrochemical device is an all-solid secondary battery or a metal-air battery.

22. A method of preparing an electrochemical device, the method comprising:

forming an anode active material layer on an anode current collector; and depositing an oxide represented by Formula 1 on the anode active material layer to prepare a protected anode and the electrochemical device:

$$A_xM_yO_{100-x-y} \qquad \text{Formula 1}$$

wherein, in Formula 1,

A is at least one of Ge, Sb, Bi, Se, Sn, or Pb,

M is at least one of In, Tl, Sb, Bi, S, Se, Te, or Po,

A and M are different from each other, and

0<x<1000 and 0<y<100.

23. The method of claim 22, wherein the depositing of the oxide comprises physical chemical vapor deposition.

24. The method of claim 22, wherein the depositing of the oxide comprises sputtering.

* * * * *